(12) United States Patent
Lewis

(10) Patent No.: US 10,766,982 B2
(45) Date of Patent: Sep. 8, 2020

(54) CATIONIC POLYMERIZATION OF OLEFINS USING GREEN ACIDS

(71) Applicant: Stewart P. Lewis, Zanesville, OH (US)

(72) Inventor: Stewart P. Lewis, Zanesville, OH (US)

( * ) Notice: Subject to any disclaimer, the term of this patent is extended or adjusted under 35 U.S.C. 154(b) by 0 days.

(21) Appl. No.: 16/394,441

(22) Filed: Apr. 25, 2019

(65) Prior Publication Data

US 2019/0330395 A1 Oct. 31, 2019

Related U.S. Application Data

(60) Provisional application No. 62/662,726, filed on Apr. 25, 2018.

(51) Int. Cl.
*C08F 110/10* (2006.01)

(52) U.S. Cl.
CPC ........ *C08F 110/10* (2013.01); *C08F 2410/01* (2013.01)

(58) Field of Classification Search
CPC .................................................... C08F 110/10
See application file for complete search history.

(56) References Cited

U.S. PATENT DOCUMENTS

2011/0275773 A1* 11/2011 Lewis ................... C08F 10/00 526/190

OTHER PUBLICATIONS

Gandini, A.; Yang, T. H.; 1997; The Heterogeneous Cationic Polymerization of Aromatic Alkenes by Aluminum Triflate; Chapter 11; 11 Pages.

Yu Xing Peng, et al; Polymerisation Electrophile Du 1,3-Pentadiene Amorcee Par Le Triflate D'Aluminium; Eur. Polym. J. vol. 30, No. 1, pp. 69-77, 1994.

J. Collomb, B. Morin, et al.; Cationic Polymerization Induced By Metal Salts-I; Hetergeneous Systems; European Polymer Journal vol. 16, pp. 1135-1144; 1980.

Collomb, J.; Gandini, A.; Cheradame, H. Cationic Polymerisation Induced by Metal Salts of Strong Acids: Kinetics and Mechanism Macromol. Symp. 1982, 28, 136.

A. Gandini, et al.; The Heterogeneous Cationic Polymerization of Aromatic Monomers by Aluminium Triflate Polym. Prepr., Am. Chem. Soc. Div. Polym. Chem. 1996, 37, 359-360; 2 Pages.

Collornb, J.; Arlaud, P.; Gandini, A.; Cheradarne, H. Cationic Polymerisation and Electrophilic Reactions Promoted by Metal Salts of Strong Acids Proceedings IUPAC 6th International Symposium on Cationic Polymerization and Related Processes 1984, 49-67.

Gandini, A.; Yang, Y. The Heterogeneous Cationic Polymerization of Aromatic Monomers by Aluminum Triflate Polym. Prepr., Am. Chem. Soc. Div. Polym. Chem. 1996, 37, 359-360.

* cited by examiner

*Primary Examiner* — Catherine S Branch
(74) *Attorney, Agent, or Firm* — Renner, Kenner, Greive, Bobak, Taylor & Weber

(57) ABSTRACT

A processes for effecting the cationic polymerization of olefins in a controlled manner that includes the step of contacting olefin monomers and a catalytically effective amount of an initiating composition containing (A) a recyclable aluminum, gallium, or indium perfluorinated organosulfonate, (B) a solubilizing agent, (C) an initiator selected from the group consisting of (i) carbocation synthons, (ii) halogenium ion synthons, (iii) Brønsted acids, and (iv) silicenium ion synthons, and optionally (D) a nucleophilic additive. The invention further includes a process for recycling aluminum, gallium, or indium perfluorinated organosulfonates that includes the steps of aqueous extraction and dehydration. A novel initiator system is also disclosed.

14 Claims, No Drawings

CATIONIC POLYMERIZATION OF OLEFINS USING GREEN ACIDS

CROSS-REFERENCE TO RELATED APPLICATIONS

This application claims the benefit of U.S. Provisional Application No. 62/662,726, filed Apr. 25, 2018.

FIELD OF THE INVENTION

The present invention relates to initiator systems and their application in the controlled polymerization of olefins. More particularly, the present invention relates to initiator systems containing recyclable Group 13 perfluorinated organosulfonate Lewis acid coinitiators that are amenable to the production of well-defined polymers.

BACKGROUND OF THE INVENTION

It is well known that olefins can be polymerized by acids, in both a living and non-living manner, via a cationic mechanism. In some instances, well-defined polymers can be formed. Such polymers have a specific type of end-group functionality, a polymer chain of regulated chemical composition, well-defined architecture, and a specified range of molecular weights. Furthermore, it is common knowledge that known art methods, for the production of polymers, whether well-defined or not, from low reactivity olefins such as isobutene, employ acids that cannot be recycled by extraction with water followed by reactivation via simple dehydration. Thus, known art chemistries are deficient from a sustainability standpoint.

Trifluoromethanesulfonates of aluminum, gallium, and indium are known to function as Lewis acids. In some instances they have been recognized as being useful for effecting cationic polymerization of olefins in an uncontrolled manner and in most cases they function as heterogeneous acids. There are no examples in which these acids function to effect polymerization in a controlled manner that gives rise to well-defined polymers. As such, known art methods for the polymerization of olefins that employ these acids typically operate in a heterogeneous fashion and do not produce well-defined polymers. Thus, known art chemistries that make use of these acids for the preparation of polymers derived from olefins are deficient in that they do not operate in a controlled fashion. Additionally, neither the recapture nor the reuse of such acids for polymerization have been demonstrated in the known art.

Initiator systems capable of producing well-defined polymers, especially from low reactivity olefins, are highly desirable from both commercial and environmental perspectives. It is even more desirable that such initiator systems make use of acid components that are recyclable. The present invention is directed to these, as well as other, important needs.

SUMMARY OF THE INVENTION

Any one or more of the foregoing aspects of the present invention, together with the advantages thereof over the known art relating to processes for effecting the cationic polymerization of olefins, which shall become apparent from the specification that follows, may be accomplished by the invention as hereinafter described and claimed.

The present invention provides a process for cationically polymerizing olefin monomers in a controlled manner. The process comprises the step of contacting olefin monomers and a catalytically effective amount of an initiating composition containing (A) a recyclable coinitiator, (B) a solubilizing agent, (C) an initiator, and optionally, (D) a nucleophilic additive. The recyclable coinitiator (A) is selected from aluminum, gallium, and indium perfluorinated organosulfonates of the formula (I):

wherein M is a metal selected from aluminum, gallium, and indium, and $R_1$, $R_2$, and $R_3$ are the same or different, and are selected from the group consisting of perfluoroalkylsulfonate or perfluoroarylsulfonate. The solubilizing agent (B) is any compound soluble in the reaction medium that contains an n-donor atom including alcohols, ethers, ketones, aldehydes, esters, carboxylic acids, anhydrides, acyl halides, amides, amines, nitriles, thiols, thioethers, sulfoxides, disulfides, nitro, sulfonyl, carbonyl, and thiocarbonyl. The initiator (C) is a compound selected from the group consisting of (i) carbocation synthons having the formula (II):

wherein $R_4$, $R_5$, and $R_6$ are a variety of alkyl or aromatic groups or H or combinations thereof, (b) n is the number of initiator sites and is preferably greater than or equal to 1, and (c) X is the functional group that the Lewis acid coinitiator abstracts to form an initiating carbocation. X is typically a halogen, ester, acyl halide, ether, alcohol, or acid group; (ii) halogenium ion synthons; (iii) Brønsted acids; and (iv) silicenium ion synthons having the formula (III):

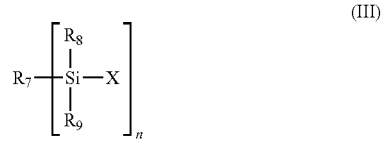

wherein (a) $R_7$, $R_8$, and $R_9$ are a variety of alkyl or aromatic groups or combinations thereof, (b) n is the number of initiator sites and is preferably greater than or equal to 1, and (c) X is the functional group that the Lewis acid coinitiator abstracts to form an initiating silicenium ion. X is typically a halogen, ester, ether, alcohol, or acid group. The optional nucleophilic additive (D) is any compound that transforms an uncontrolled polymerization into a controlled polymerization, either by decreasing the ionicity of the system, or by stabilizing the propagating carbocation, or through increasing the anion nucleophilicity including ethers, ketones, esters, amides, pyridines, phosphines, sulfoxides, amides, amines, and tetraalkylammonium salts. Following the completion of polymerization, the process further comprises the steps of (i) aqueous extraction to effect recovery of the recyclable coinitiator followed by (ii) its reactivation by dehydration.

In another embodiment of the invention, the solubilizing agent, initiator, and optional nucleophilic additive are the same molecule.

The present invention also provides an initiator systems for use with a reaction mixture in the controlled cationic polymerization of olefins. The initiator system comprises (A) a recyclable coinitiator, (B) a solubilizing agent, (C) an initiator, and optionally, (D) a nucleophilic additive. The recyclable coinitiator (A) is selected from aluminum, gallium, and indium perfluorinated organosulfonates of the formula (I):

wherein (a) M is a metal selected from aluminum, gallium, and indium, and (b) $R_1$, $R_2$, and $R_3$ are the same or different, and are selected from the group consisting of perfluoroalkylsulfonate or perfluoroarylsulfonate. The solubilizing agent (B) is any compound soluble in the reaction medium that contains an n-donor atom including alcohols, ethers, ketones, aldehydes, esters, carboxylic acids, anhydrides, acyl halides, amides, amines, nitriles, thiols, thioethers, sulfoxides, disulfides, nitro, sulfonyl, carbonyl, and thiocarbonyl. The initiator (C) is a compound selected from the group consisting of (i) carbocation synthons having the formula (II):

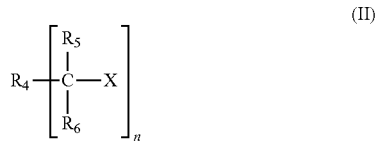

wherein (a) $R_4$, $R_5$, and $R_6$ are a variety of alkyl or aromatic groups or H or combinations thereof, (b) n is the number of initiator sites and is preferably greater than or equal to 1, and (c) X is the functional group that the Lewis acid coinitiator abstracts to form an initiating carbocation. X is typically a halogen, ester, acyl halide, ether, alcohol, or acid group; (ii) halogenium ion synthons; (iii) Brønsted acids; and (v) silicenium ion synthons having the formula (III):

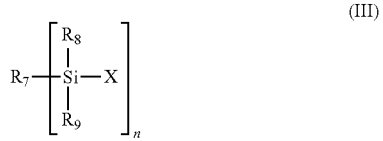

wherein (a) $R_7$, $R_8$, and $R_9$ are a variety of alkyl or aromatic groups or combinations thereof, (b) n is the number of initiator sites and is preferably greater than or equal to 1, and (c) X is the functional group that the Lewis acid coinitiator abstracts to form an initiating silicenium ion. X is typically a halogen, ester, ether, alcohol, or acid group. The optional nucleophilic additive (D) is any compound that transforms an uncontrolled polymerization into a controlled polymerization, either by decreasing the ionicity of the system, or by stabilizing the propagating carbocation, or through increasing the anion nucleophilicity, and may include, but is not limited to, ethers, ketones, esters, amides, pyridines, phosphines, sulfoxides, amides, amines, and tetraalkylammonium salts.

In another embodiment of the invention, the solubilizing agent, initiator, and optional nucleophilic additive are the same molecule.

Beneficially, the above initiator system can be used in the controlled cationic polymerization of olefin monomers in a sustainable manner. Lewis acid coinitiators of the above initiator system can be recycled by aqueous extraction followed by reactivation via dehydration, whereas the Lewis acid coinitiator components of known art initiator systems cannot be recycled in such a manner.

The foregoing general description and the following detailed description are exemplary and explanatory only and are not restrictive of the invention, as defined in the appended claims.

DETAILED DESCRIPTION OF ILLUSTRATIVE EMBODIMENTS

In the present invention, the use of novel initiator systems containing recyclable Lewis acid coinitiators has been developed in the controlled cationic polymerization of olefins. Unlike previously described systems based on aluminum, gallium, and indium trifluoromethanesulfonates the process of the current invention operates in a homogeneous manner and readily gives rise to well-defined polymers. Furthermore, unlike prior art methods for the polymerization of low reactivity olefins, the coinitiators used in the process of the current invention can readily be recaptured via aqueous extraction and reactivated by dehydration. In other words, the polymerization process of the present invention provides for the production of well-defined polymers, derived from olefins and a unique initiator system, wherein the Lewis acid coinitiator is readily recyclable.

As used herein and in the appended claims, the singular forms "a," "an," and "the" include the plural reference unless the context clearly indicates otherwise. Thus, for example, a reference to "a compound" is a reference to one or more compounds and equivalents thereof known to those skilled in the art, and so forth.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, the preferred methods and materials are now described. All publications mentioned hereunder are incorporated herein by reference. Unless mentioned otherwise, the techniques employed or contemplated herein are standard methodologies well known to one of ordinary skill in the art. The materials, methods, and examples are illustrative only and not limiting.

In at least one embodiment of the present invention, a process for cationically polymerizing olefin monomers in a reaction mixture is provided. The process comprises the step of contacting olefin monomers and a catalytically effective amount of an initiating composition. In one embodiment the novel initiating systems are useful in the homo- and copolymerization of olefin monomers possessing at least one ethylenically unsaturated group capable of undergoing cationic polymerization and may be represented by the non-limiting generic structural formula (IV):

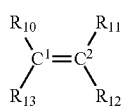

wherein $R_{10}$, $R_{11}$, $R_{12}$, and $R_{13}$ may be the same or different and may include, but not limited to, a hydrogen, Y, (wherein Y is a halogen, an ester, an acyl halide, an ether, an alcohol, an acid group), O, N, $SiY_3$, $OSiY_3$, $C_1$-$C_{10}$ alkyl, $C_3$-$C_{10}$ cycloalkyl, $C_6$-$C_{18}$ aryl, $C_2$-$C_8$ alkenyl, or $C_2$-$C_{10}$ alkyne, wherein any of $C_1$-$C_{10}$ alkyl, $C_3$-$C_{10}$ cycloalkyl, $C_6$-$C_{18}$ aryl, $C_2$-$C_8$ alkenyl, or $C_2$-$C_{10}$ alkyne may be substituted by Y. Furthermore, $R_{10}$, $R_{11}$, $R_{12}$, and $R_{13}$ may be combined together so that they represent a single or more substituents (e.g., a ring) in which $C^1$ and/or $C^2$ are members. Suitable, non-limiting examples of olefin monomers suitable for use in the present invention include, but are not necessarily limited to, ethylene, propylene, 1-butene, isobutylene, 2-methyl-1-butene, butadiene, isoprene, piperylene, 2,3-dimethylbutadiene, 2,4-dimethyl-1,3-pentadiene, cyclopentadiene, methylcyclopentadiene, limonene, myrcene, 1,3-cyclohexadiene, alpha and beta pinene, alpha-methyl styrene, styrene, p-methyl styrene, vinyl-toluene (and its isomers), divinylbenzene, indene, coumarone, methyl vinyl ether, ethyl vinyl ether, isobutyl vinyl ether, 4-vinylbenzyl chloride, styrylethyltimethoxysilane, and styrylethyltrichlorosilane.

The initiating composition may contain two general classes or embodiments of initiator systems, each initiator system comprising a recyclable Group 13 perfluorinated organosulfonate Lewis acid coinitiator, a solubilizing agent, an initiator compound, and optionally, a nucleophilic additive. In one embodiment the solubilizing agent, initiator, and nucleophilic additive are three separate molecules. In another embodiment the solubilizing agent, initiator, and nucleophilic additive are the same molecule.

The phrase "recyclable Group 13 perfluorinated organosulfonate," as used herein, refers to the perfluoroalkylsulfonate and perfluoroarylsulfonate salts of aluminum, gallium, and indium, and may be represented by the non-limiting generic structural formula (I):

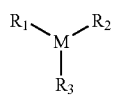

wherein, (a) M is a metal selected from aluminum, gallium, and indium, and (b) $R_1$, $R_2$, and $R_3$ are the same or different, and are selected from the group consisting of perfluoroalkylsulfonate or perfluoroarylsulfonate. Non-limiting examples of recyclable Group 13 perfluorinated organosulfonates include aluminum trifluoromethanesulfonate, gallium trifluoromethanesulfonate, indium trifluoromethanesulfonate, aluminum perfluorooctanesulfonate, gallium perfluorooctanesulfonate, indium perfluorooctanesulfonate, aluminum pentafluorophenylsulfonate, gallium pentafluorophenylsulfonate, indium pentafluorophenyl sulfonate, aluminum 1-perfluoronaphthyl sulfonate, gallium 1-perfluoronaphthylsulfonate, indium 1-perfluoronaphthyl sulfonate, aluminum 2-perfluoronaphthyl sulfonate, gallium 2-perfluoronaphthyl sulfonate, indium 2-perfluoronaphthyl sulfonate, aluminum 2-perfluorobiphenyl sulfonate, gallium 2-perfluorobiphenyl sulfonate, indium 2-perfluorobiphenyl sulfonate, aluminum 3-perfluorobiphenyl sulfonate, gallium 3-perfluorobiphenyl sulfonate, indium 3-perfluorobiphenyl sulfonate, aluminum 4-perfluorobiphenylsulfonate, gallium 4-perfluorobiphenyl sulfonate, indium 4-perfluorobiphenyl sulfonate, aluminum 3,5-bis(trifluoromethyl)phenyl sulfonate, gallium 3,5-bis(trifluoromethyl)phenyl sulfonate, and indium 3,5-bis(trifluoromethyl)phenylsulfonate. These recyclable Group 13 perfluorinated organosulfonate Lewis acid coinitiators allow for the production of well-defined polymers from a broad range of olefins, including those of low reactivity. These recyclable Group 13 perfluorinated organosulfonate also serve as highly recyclable Lewis acids, which can be recovered in quantitative yield from the polymerization mixture via aqueous extraction, and then restored to full activity by simple dehydration.

The aforementioned recyclable Group 13 perfluorinated organosulfonate Lewis acid coinitiators have no appreciable solubility in solvents or monomers commonly employed in cationic polymerization. As such, they do not induce polymerization in a controlled and homogeneous manner to produce polymers that are well-defined. Instead, at best they produce ill-defined polymers and function in a heterogeneous manner. In order to bring produce well-defined polymers, the recyclable Group 13 perfluorinated organosulfonate Lewis acid coinitiator must be soluble in the polymerization charge. This can be accomplished through the use of a solubilizing agent, which undergoes reaction with the Lewis acid coinitiator such that the resultant species now functions as a homogeneous acid.

The phrase "solubilizing agent," as used herein, refers to compounds that are soluble in the polymerization charge, and contain n-donor atoms in their structure, which can form a coordinative bond to the Lewis acid coinitiator. Upon forming a coordinate bond with the recyclable Group 13 perfluorinated organosulfonate Lewis acid coinitiator, the solubilizing agent imparts solubility to the Lewis acid coinitiator. In doing so, the solubilizing agent allows the recyclable Group 13 perfluorinated organosulfonate Lewis acid coinitiator to induce controlled polymerization of olefins and yield polymers of well-defined structure. Some non-limiting examples of n-donor functional groups contained in solubilizing agents include alcohols, ethers, ketones, aldehydes, esters, carboxylic acids, anhydrides, acyl halides, amides, amines, nitriles, thiols, thioethers, sulfoxides, disulfides, nitro, sulfonyl, carbonyl, and thiocarbonyl. Non-limiting examples of solubilizing agents include diethyl ether, dibutyl ether, diphenyl ether, acetone, methyl ethyl ketone, acetaldehyde, benzaldehyde, methyl acetate, butyl acetate, acetic acid, butyric acid, acetyl chloride, benzyl chloride, dimethylacetamide, triethylamine, acetonitrile, benzonitrile, methanethiol, tetrahydrothiophene, dimethyl sulfoxide, disulfur dichloride, nitromethane, nitrotoluene, carbon dioxide, and carbon disulfide.

The phrase "initiator," as used herein, refers to any compound that once it undergoes reaction with the recyclable Group 13 perfluorinated organosulfonate Lewis acid coinitiator, it furnishes an electrophile that starts polymerization. Such electrophiles include carbocations, acylium ions, $H^+$, halogenium ions, and silicenium ions. As such, initiators useful for the current invention are best understood by separating them into distinct classes. These classes include, (i) carbocation synthons having the formula (II); (ii)

halogenium ion synthons; (iii) Brønsted acids, and (iv) silicon compounds having the formula (III).

Carbocation synthons can be represented by the formula (II):

(II)

wherein (a) $R_4$, $R_5$, and $R_6$ are a variety of alkyl or aromatic groups or H or combinations thereof, (b) n is the number of initiator sites and is preferably greater than or equal to 1, and (c) X is the functional group that the Lewis acid coinitiator abstracts to form an initiating carbocation. X is typically a halogen, ester, acyl halide, ether, alcohol, or acid group. Non-limiting examples of suitable carbocation synthons useful for the present invention are cumyl chloride, p-dicumyl chloride, cumyl acetate, cumyl alcohol, cumyl methyl ether, 2-chloro-2,4,4-trimethylpentane, t-butyl chloride, neopentyl chloride, acetyl chloride, and 2-chloropropane.

Halogenium ion synthons are another useful type of initiator and include the elemental forms of the halogens and also interhalogen compounds. Halogenium ion synthons are defined as compounds capable of donating halogenium ion. Some non-limiting examples of halogenium ion synthons include: $F_2$, $Cl_2$, $Br_2$, $I_2$, ICl, and ClBr.

Brønsted acids are another class of initiators suitable for the present invention, and they are defined as compounds capable of donating $H^+$. Brønsted acid initiators can be represented by the formula RH, where R is an organic substituent or an inorganic moiety. Non-limiting examples of Brønsted acid initiators include: water, alcohols, carboxylic acids, hydrogen halides, perchloric acid, sulfuric acid, trifluoromethanesulfonic acid, fluorosulfonic acid, chlorosulfonic acid, and methanesulfonic acid.

Silicenium ion synthons can be represented by the formula (III):

(III)

wherein (a) $R_7$, $R_8$, and $R_9$ are a variety of alkyl or aromatic groups or combinations thereof, (b) n is the number of initiator sites and is preferably greater than or equal to 1, and (c) X is the functional group that the Lewis acid coinitiator abstracts to form an initiating silicenium ion. X is typically a halogen, ester, ether, alcohol, or acid group. Non-limiting examples of suitable carbocation synthons useful for the present invention include: phenyldimethylchlorosilane, 1,4-bis(chlorodimethyl silyl)benzene, phenyldimethylacetoxysilane, phenyldimethyl silanol, phenyldimethylethoxysilane, and chlorotrimethylsilane.

The phrase "nucleophilic additive," as used herein, refers for any compound that transforms an uncontrolled polymerization into a controlled polymerization, either by decreasing the ionicity of the system, or by stabilizing the propagating carbocation, or through increasing the anion nucleophilicity. Some non-limiting examples of nucleophilic additives include methyl ethyl ketone, tetrahydrofuran, diethyl ether, dimethyl sulfide, 2,6-dimethylpyridine, 2,6-di-t-butylpyridine, triphenylphosphine, dimethylsulfoxide, dimethylacetamide, dimethylformamide, triethylamine, pyridine, ethyl acetate, tetrabutylammonium acetate, tetrabutylammonium chloride, and tetrabutylammonium trifluoromethanesulfonate.

In one embodiment according to the concepts of the present invention, the solubilizing agent, initiator, and the nucleophilic additive are three separate molecules.

In another embodiment according to the concepts of the present invention, the solubilizing agent, initiator, and the nucleophilic additive are the same molecule. In order for a single compound to serve as solubilizing agent, initiator, and nucleophilic additive it must possess at least one n-donor atom capable of both solubilizing the recyclable Group 13 perfluorinated organosulfonate and transforming an uncontrolled polymerization into a controlled polymerization while also possessing at least one functionality capable of providing an initiating electrophile. Non-limiting examples of compounds that can function as the solubilizing agent, initiator, and the nucleophilic additive include: p-methoxycumyl chloride, p-methoxycumyl methyl ether, p-acetylcumyl chloride. In the foregoing examples, the para substituent serves as both the solubilizing agent and the nucleophilic additive whereas the ionizable cumyl functionality serves as the initiator. Additional non-limiting examples of compounds that can function as the solubilizing agent, initiator, and the nucleophilic additive include: acetyl chloride, trifluoroacetyl chloride, trifluoroacetic acid, trichloroacetic acid, octanoic acid, octadecanoic acid, dodecylbenzenesulfonic acid, p-toluenesulfonic acid, methanol, ethanol, 4-methoxyphenyldimethylchlorosilane, 4-acetoxyphenyldimethylacetoxysilane, 4-methoxyphenyldimethylethoxysilane. In the foregoing examples, the oxygen of the carbonyl substituents, the oxygen atom of the hydroxyl substituents, and the oxygen atoms(s) of the carbonyl or the sulfonyl substituents serve as both the solubilizing agent and the nucleophilic additive whereas acyl halide or hydroxyl functionality serve as the initiator.

Polymerization may be performed in bulk, solution, suspension or in the gas phase and may be conducted in multiple or single stages. Any number of reactor geometries or types may be used including but not limited to: batch, stirred tank, fluidized bed, continuous tank, and tubular. Polymerization reaction temperatures can range from −100° C. to 200° C. and pressures can range from 0.01 bar to 1,000 bar. In one embodiment, the polymerization reaction temperature is greater than −80° C. In another embodiment, the polymerization reaction temperature is greater than −40° C. In another embodiment, the polymerization reaction temperature is greater than −20° C. In another embodiment, the polymerization reaction temperature is greater than 0° C. In another embodiment, the polymerization reaction temperature is room temperature. In yet another embodiment the polymerization reaction temperature is above room temperature.

Monomer concentration may range from 1-100 vol % relative to the total volume of the polymerization reaction mixture depending upon the desired process conditions. In copolymerizations, the concentration of comonomer(s) can vary in any manner so as to give rise to a copolymer with desired physical properties. A "catalytically effective amount" of an initiating composition may be determined empirically by adjusting the concentration of both the initiator and the coinitiator with respect to monomer to the point that polymerization ceases to occur. When the concentrations of initiator and coinitiator are above such levels they are deemed to be present in a catalytically effective amount.

Depending on the process conditions, polymerizations involving initiator systems as described in all embodiments of the present invention may be conducted in solvents or diluents. A non-limiting list of suitable solvents/diluents includes nitromethane, methyl chloride, chloroform, dichloromethane, toluene, hexane, heptane, cyclohexane, propane, butane, and isopentane.

In the process according to the invention, the recyclable Group 13 perfluorinated organosulfonate is used in a molar ratio relative to the initiator component (mol heterogeneous Lewis acid:mol initiator) of 1:100 to 10,000:1, In one embodiment, the range is from about 1:10 to about 100:1. In another embodiment, the range is from about 1:1 to about 10:1. The initiator component concentration may range from about 1 M to about $10^{-7}$ M and is dependent upon the desired molecular weight of the polymer product.

The present invention is further defined in the following Examples, in which all parts and percentages are by weight and degrees are Celsius, unless otherwise stated. It should be understood that these Examples, while indicating preferred embodiments of the invention, are given by way of illustration only. These Examples should not, however, be viewed as limiting the scope of the invention. Form the above discussion and these Examples, one skilled in the art can ascertain the essential characteristics of this invention, and without departing from the spirit and scope thereof, can make various changes and modifications of the invention to adapt it to various usages and conditions. The claims will serve to define the invention.

EXAMPLES

Example 1

Preparation of Highly Reactive Polyisobutene Using Indium Triflate and Methanol.

A pressure reaction vessel was charged in a drybox with 0.100 g ($1.78 \times 10^{-4}$ mol) anhydrous indium trifluoromethanesulfonate, and a magnetic stir bar. The pressure reaction vessel was then sealed, removed from the drybox, affixed to a Schlenk line, and placed under dynamic nitrogen. Next, the pressure reaction vessel was charged with 9.40 g isobutene. The polymerization charge was then thermally equilibrated to 0° C. and then 0.250 mL hexane containing $1 \times 10^{-4}$ mol methanol was injected to effect dissolution of the indium trifluoromethanesulfonate, upon which polymerization began. Polymerization was then allowed to proceed for 1 hour after which it was then quenched with 5 g water. The aqueous layer was then withdrawn and placed into a clean glass receptacle. The organic layer was then washed three times with 5 g aliquots of water, each washing being collected into the glass receptacle. The aqueous layer was then calcined to dryness in a laboratory oven at T>100° C. to afford 0.0935 g of indium trifluoromethanesulfonate, or ~93.5% recovery. The organic layer was dried over calcium chloride and filtered through cotton. Volatiles from the organic layer was then evaporated to afford 8.80 g (93.62% yield) of crystal clear polyisobutene. In this case methanol served as the initiator, solubilizing agent, and nucleophilic additive.

Example 2

Preparation of Highly Reactive Polyisobutene Using Indium Triflate and Methanol.

In a second example, a pressure reaction vessel was charged in a drybox with 0.100 g ($1.78 \times 10^{-4}$ mol) anhydrous indium trifluoromethanesulfonate, and a magnetic stir bar. The pressure reaction vessel was then sealed, removed from the drybox, affixed to a Schlenk line, and placed under dynamic nitrogen. Next, the pressure reaction vessel was charged with 11.10 g isobutene. The polymerization charge was then thermally equilibrated to 22° C. and then 0.250 mL hexane containing $1 \times 10^{-4}$ mol methanol was injected to effect dissolution of the indium trifluoromethanesulfonate, upon which polymerization began. Polymerization was then allowed to proceed for 2 hours after which it was then quenched with 5 g water. The aqueous layer was then withdrawn and placed into a clean glass receptacle. The organic layer was then washed three times with 5 g aliquots of water, each washing being collected into the glass receptacle. The aqueous layer was then calcined to dryness in a laboratory oven at T>100° C. to afford 0.100 g of indium trifluoromethanesulfonate, or ~100% recovery. The organic layer was dried over calcium chloride and filtered through cotton. Volatiles from the organic layer was then evaporated to afford 8.10 g (72.98% yield) of crystal clear polyisobutene. In this case methanol served as the initiator, solubilizing agent, and nucleophilic additive.

Other embodiments that provided polymerizations with $In(OTf)_3$ and methanol as the initiator/solubilizing agent/nucleophilic additive were also run. In each case, the acid is easily recycled and the polymer yield is high but polymer molecular weight, polydispersity, and exo-olefinic content were not determined.

Further predictive examples have been provided based upon the molecular weights (MW) and temperature (T) profiles of previous work, including the examples above. It will be appreciated that it is possible that higher or lower molecular weights may be provided for a given temperature, and may also depend upon the concentration of the initiator. Nevertheless, it is believed that recovery of the acid, based on gravimetric analysis of the dehydrated aqueous extract obtained, will be 100% or close thereto. Further, it is believed that exo-olefinic end-group functionality will be high (ca. 90% or more) based on previous work; however, it might be slightly higher or lower than this value. Thus, the following predictive examples are provided.

Example 3

Preparation of Highly Reactive Polyisobutene Using Aluminum Triflate and Ethanol.

A pressure reaction vessel may be charged in a drybox with 0.0948 g ($2 \times 10^{-4}$ mol) anhydrous aluminum trifluoromethanesulfonate, and a magnetic stir bar. The pressure reaction vessel may then be sealed, removed from the drybox, affixed to a Schlenk line, and placed under dynamic nitrogen. The pressure reaction vessel may then be charged with 15 g n-hexane. Next, the pressure reaction vessel can be charged with 10 g isobutene. The polymerization charge may then be thermally equilibrated to 0° C. and then 0.0046 g ($1 \times 10^{-4}$ mol) ethanol may be injected to effect dissolution of the aluminum trifluoromethanesulfonate, upon which polymerization can begin. Polymerization may then be allowed to proceed for 4 hours after which it can then be quenched with 5 g water. The aqueous layer may then be withdrawn and placed into a clean glass receptacle. The organic layer may then be washed three times with 5 g aliquots of water, each washing being collected into the glass receptacle. The aqueous layer may then be calcined to dryness in a laboratory oven at T>100° C. to afford 0.0948 g of anhydrous aluminum trifluoromethanesulfonate, or 100% recovery. This recaptured anhydrous aluminum trifluoromethanesulfonate can then be reused to effect cationic polymerization. The organic layer may be dried over calcium chloride and filtered through cotton. Volatiles from the organic layer may then be evaporated to afford 9.50 g of crystal clear polyisobutene with an exo-olefinic end-group functionality of ≥90%, $\overline{M}_w$=50,000 g·mol$^{-1}$, and $\overline{M}_w/\overline{M}_n$=2.05. In this case ethanol served as the initiator, solubilizing agent, and nucleophilic additive.

Example 4

Preparation of Highly Reactive Polyisobutene Using Aluminum Triflate and Ethanol.

A pressure reaction vessel may be charged in a drybox with 0.103 g (2×10$^{-4}$ mol) anhydrous gallium trifluoromethanesulfonate, and a magnetic stir bar. The pressure reaction vessel may then be sealed, removed from the drybox, affixed to a Schlenk line, and placed under dynamic nitrogen. The pressure reaction vessel may then be charged with 15 g n-hexane. Next, the pressure reaction vessel can be charged with 10 g isobutene. The polymerization charge may then be thermally equilibrated to 20° C. and then 0.0046 g (1×10$^{-4}$ mol) ethanol can be injected to effect dissolution of the gallium trifluoromethanesulfonate, upon which polymerization can begin. Polymerization may then be allowed to proceed for 4 hours after which it may then be quenched with 5 g water. The aqueous layer may then be withdrawn and placed into a clean glass receptacle. The organic layer can then be washed three times with 5 g aliquots of water, each washing being collected into the glass receptacle. The aqueous layer may then be calcined to dryness in a laboratory oven at T>100° C. to afford 0.103 g of anhydrous gallium trifluoromethanesulfonate, or 100% recovery. This recaptured anhydrous gallium trifluoromethanesulfonate can then be reused to effect cationic polymerization. The organic layer may be dried over calcium chloride and filtered through cotton. Volatiles from the organic layer may then be evaporated to afford 9.90 g of crystal clear polyisobutene with an exo-olefinic end-group functionality of ≥90%, =20,000 g·mol$^{-1}$, and $\overline{M}_w/\overline{M}_n$=2.00. In this case ethanol served as the initiator, solubilizing agent, and nucleophilic additive.

Example 5

Preparation of Narrow Polydispersity Highly Reactive Polyisobutene Using Indium Triflate, Cumyl Chloride, and Diethyl Ether.

A pressure reaction vessel may be charged in a drybox with 0.112 g (2×10$^{-4}$ mol) anhydrous indium trifluoromethanesulfonate, and a magnetic stir bar. The pressure reaction vessel may then be sealed, removed from the drybox, affixed to a Schlenk line, and placed under dynamic nitrogen. The pressure reaction vessel may then be charged with 10 g dichloromethane and 10 g n-hexane. Next, the pressure reaction vessel can be charged with 10 g isobutene. The polymerization charge may then be thermally equilibrated to 0° C. and then 0.0148 g (2×10$^4$ mol) diethyl ether may be injected to effect dissolution of the indium trifluoromethanesulfonate. Next, 0.0154 g (1×10$^{-4}$ mol) cumyl chloride may be injected upon which polymerization may begin. Polymerization may then be allowed to proceed for 4 hours after which it can then be quenched with 5 g water. The aqueous layer may then be withdrawn and placed into a clean glass receptacle. The organic layer may then be washed three times with 5 g aliquots of water, each washing being collected into the glass receptacle. The aqueous layer may then be calcined to dryness in a laboratory oven at T>100° C. to afford 0.112 g of anhydrous indium trifluoromethanesulfonate, or 100% recovery. This recaptured anhydrous indium trifluoromethanesulfonate may then be reused to effect cationic polymerization. The organic layer may be dried over calcium chloride and filtered through cotton. Volatiles from the organic layer may then be evaporated to afford 9.60 g of crystal clear polyisobutene with an exo-olefinic end-group functionality of ≥90%, $\overline{M}_w$=10,000 g·mol$^{-1}$, and $\overline{M}_w/\overline{M}_n$=1.10. In this case, cumyl chloride served as the initiator and diethyl ether served as both the solubilizing agent and the nucleophilic additive.

Although the present invention has been described in considerable detail with reference to certain embodiments, other embodiments are possible. Therefore, the spirit and scope of the appended claims should not be limited to the description of the embodiments contained herein.

What is claimed:

1. A process for cationically polymerizing olefin monomers in a controlled manner in a reaction mixture, the cationic polymerization process comprising:
contacting olefin monomers and a catalytically effective amount of an initiating composition containing (A) a recyclable coinitiator, (B) a solubilizing agent, (C) an initiator, and optionally, (D) a nucleophilic additive, to form a reaction medium;
wherein the recyclable coinitiator (A) is selected from aluminum, gallium, and

indium perfluorinated organosulfonates of the formula (I):
wherein M is a metal selected from aluminum, gallium, and indium, and $R_1$, $R_2$, and $R_3$ are the same or different, and are selected from the group consisting of perfluoroalkylsulfonate or perfluoroarylsulfonate;
wherein the solubilizing agent (B) is any compound soluble in the reaction medium that contains an n-donor atom and allows the recyclable coinitiator to induce controlled polymerization;
wherein the initiator (C) is a compound selected from the group consisting of (i) carbocation synthons having the formula (II):

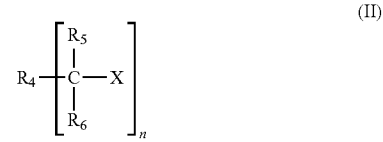

wherein $R_4$ is selected from an alkyl group, an aromatic group, and combinations thereof, wherein $R_5$, and $R_6$ are the same or different and are selected from an alkyl group, an aromatic group, an H, and combinations thereof, wherein n is an integer greater than or equal to 1 and is the number of initiator sites, and wherein X is selected from the group consisting of a functional group that the Lewis acid coinitiator abstracts to form an initiating carbocation, halogenium ion synthons, Brønsted acids, and silicenium ion synthons having the formula (III):

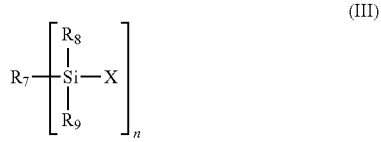

(III)

wherein $R_7$, $R_8$, and $R_9$ are the same or different and are selected from an alkyl group, an aromatic group, and combinations thereof, wherein n is an integer greater than or equal to 1 and is the number of initiator sites, and wherein X is the functional group that the Lewis acid coinitiator abstracts to form an initiating silicenium ion; and wherein the optional nucleophilic additive (D) is any compound that assists in controlling polymerization as allowed by the solubilizing agent, either by decreasing the ionicity of the system, or by stabilizing the propagating carbocation, or through increasing the anion nucleophilicity.

2. The process of claim 1, wherein the solubilizing agent (B) is selected from the group consisting of alcohols, ethers, ketones, aldehydes, esters, carboxylic acids, anhydrides, acyl halides, amides, amines, nitriles, thiols, thioethers, sulfoxides, disulfides, nitro, sulfonyl, carbonyl, and thiocarbonyl.

3. The process of claim 1, wherein the X of formula (II) or (III) is selected from the group consisting of a halogen, ester, acyl halide, ether, alcohol, and acid group.

4. The process of claim 1, wherein the optional nucleophilic additive is selected from the group consisting of ethers, ketones, esters, amides, pyridines, phosphines, sulfoxides, amides, amines, and tetraalkylammonium salts.

5. The process of claim 1, wherein olefin monomers are selected from the group consisting of ethylene, propylene, 1-butene, isobutylene, 2-methyl-1-butene, butadiene, isoprene, piperylene, 2,3-dimethylbutadiene, 2,4-dimethyl-1,3-pentadiene, cyclopentadiene, methylcyclopentadiene, limonene, myrcene, 1,3-cyclohexadiene, alpha and beta pinene, alpha-methyl styrene, styrene, p-methyl styrene, vinyl-toluene (and its isomers), divinylbenzene, indene, coumarone, methyl vinyl ether, ethyl vinyl ether, isobutyl vinyl ether, 4-vinylbenzyl chloride, styrylethyltimethoxysilane, and styrylethyltrichlorosilane.

6. The process of claim 1, wherein the recyclable aluminum, gallium, and indium perfluorinated organosulfonates is selected from the group consisting of aluminum trifluoromethanesulfonate, gallium trifluoromethanesulfonate, indium trifluoromethanesulfonate, aluminum perfluorooctanesulfonate, gallium perfluorooctanesulfonate, indium perfluorooctanesulfonate, aluminum pentafluorophenylsulfonate, gallium pentafluorophenylsulfonate, indium pentafluorophenylsulfonate, aluminum 1-perfluoronaphthylsulfonate, gallium 1-perfluoronaphthylsulfonate, indium 1-perfluoronaphthylsulfonate, aluminum 2-perfluoronaphthylsulfonate, gallium 2-perfluoronaphthylsulfonate, indium 2-perfluoronaphthylsulfonate, aluminum 2-perfluorobiphenylsulfonate, gallium 2-perfluorobiphenylsulfonate, indium 2-perfluorobiphenylsulfonate, aluminum 3-perfluorobiphenylsulfonate, gallium 3-perfluorobiphenylsulfonate, indium 3-perfluorobiphenylsulfonate, aluminum 4-perfluorobiphenylsulfonate, gallium 4-perfluorobiphenylsulfonate, indium 4-perfluorobiphenylsulfonate, aluminum 3,5-bis(trifluoromethyl)phenylsulfonate, gallium 3,5-bis(trifluoromethyl)phenylsulfonate, and indium 3,5-bis(trifluoromethyl)phenylsulfonate.

7. The process of claim 1, wherein the solubilizing agent, initiator, and nucleophilic additive are the same molecule.

8. The process of claim 1, wherein, following completion of polymerization, the recyclable coinitiator is removed by aqueous extraction and subsequently reactivated by dehydration.

9. The process according to claim 1, wherein the cationic polymerization of the olefin monomer occurs in at least one polymerization step phase selected from the group consisting of bulk, suspension, gas phase, and combinations thereof.

10. The process according to claim 1, wherein the cationic polymerization occurs in a controlled manner such that it produces well-defined polymers.

11. A homogeneous initiator system for use with a reaction mixture in the cationic polymerization of olefins, the initiator system comprising:

(A) a recyclable coinitiator selected from aluminum, gallium, and indium

(I)

perfluorinated organosulfonates of the formula (I):

wherein M is a metal selected from aluminum, gallium, and indium, and $R_1$, $R_2$, and $R_3$ are the same or different, and are selected from the group consisting of perfluoroalkylsulfonate or perfluoroarylsulfonate;

(B) a solubilizing agent selected from any compound soluble in the reaction medium that contains an n-donor atom and allows the recyclable coinitiator to induce controlled polymerization;

(C) an initiator selected from the group consisting of (i) carbocation synthons having the formula (II):

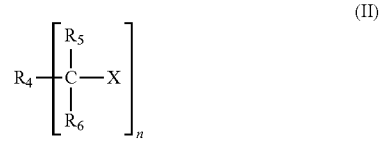

(II)

wherein $R_4$ is selected from an alkyl group, an aromatic group, and combinations thereof, wherein $R_5$, and $R_6$ are the same or different and are selected from an alkyl group, an aromatic group, an H, and combinations thereof, wherein n is an integer greater than or equal to 1 and is the number of initiator sites, and wherein X is a functional group that the Lewis acid coinitiator abstracts to form an initiating carbocation, (ii) halogenium ion synthons, (iii) Brønsted acids, and (iv) silicenium ion synthons having the formula (III):

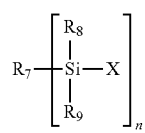

(III)

wherein (a) $R_7$, $R_8$, and $R_9$ are the same or different, and are selected from an alkyl group, an aromatic group, and combinations thereof, wherein n is an integer greater than or equal to 1 and is the number of initiator sites, and wherein X is a functional group that the Lewis acid coinitiator abstracts to form an initiating silicenium ion; and optionally, (D) a nucleophilic additive selected from any compound that assists in controlling polymerization as allowed by the solubilizing agent, either by decreasing the ionicity of the system, or by stabilizing the propagating carbocation, or through increasing the anion nucleophilicity.

12. The homogeneous initiator system of claim 11, wherein the solubilizing agent (B) is selected from the group consisting of alcohols, ethers, ketones, aldehydes, esters, carboxylic acids, anhydrides, acyl halides, amides, amines, nitriles, thiols, thioethers, sulfoxides, disulfides, nitro, sulfonyl, carbonyl, and thiocarbonyl.

13. The homogeneous initiator system of claim 11, wherein the X of formula (II) or (Ill) is selected from the group consisting of a halogen, ester, acyl halide, ether, alcohol, and acid group.

14. The homogeneous initiator system of claim 11, wherein the optional nucleophilic additive is selected from the group consisting of ethers, ketones, esters, amides, pyridines, phosphines, sulfoxides, amides, amines, and tetraalkylammonium salts.

* * * * *